US 6,456,027 B1

(12) United States Patent
Pruessel

(10) Patent No.: US 6,456,027 B1
(45) Date of Patent: Sep. 24, 2002

(54) CLOSING DEVICE WITH A SAFETY FUNCTION

(75) Inventor: Holger Pruessel, Buehlertal (DE)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 09/674,129

(22) PCT Filed: Oct. 28, 1999

(86) PCT No.: PCT/DE99/03454

§ 371 (c)(1),
(2), (4) Date: Dec. 8, 2000

(87) PCT Pub. No.: WO00/52803

PCT Pub. Date: Sep. 8, 2000

(30) Foreign Application Priority Data

Feb. 27, 1999 (DE) .......................................... 199 08 658

(51) Int. Cl.⁷ ............................. G05B 5/00; H02H 7/08; H02P 1/00; H02P 3/00; H02P 7/00
(52) U.S. Cl. ........................ 318/445; 318/286; 318/280; 318/467
(58) Field of Search ................................ 318/440–466, 318/484, 283, 139, 286, 467, 476, 280, 480; 701/36, 49

(56) References Cited

U.S. PATENT DOCUMENTS

| 4,900,994 | A | * | 2/1990 | Mizuta |
| 5,436,539 | A | * | 7/1995 | Wrenbeck et al. |
| 5,459,379 | A | * | 10/1995 | Takeda et al. |
| 5,483,135 | A | * | 1/1996 | Parks |
| 5,530,329 | A | * | 6/1996 | Shigematsu et al. |
| 5,585,705 | A | * | 12/1996 | Brieden |
| 5,774,046 | A | * | 6/1998 | Ishihara et al. |
| 5,832,664 | A | * | 11/1998 | Tajima et al. |
| 5,945,796 | A | * | 8/1999 | Ohmori et al. |
| 6,034,495 | A | * | 3/2000 | Tamagawa et al. |
| 6,034,497 | A | * | 3/2000 | Tamagawa et al. |
| 6,051,945 | A | * | 4/2000 | Furukawa |
| 6,150,784 | A | * | 11/2000 | Nagaoka |
| 6,219,599 | B1 | * | 4/2001 | Lamm et al. |
| 6,297,609 | B1 | * | 10/2001 | Takahashi et al. |
| 2001/0030520 | A1 | * | 10/2001 | Losey et al. |

FOREIGN PATENT DOCUMENTS

| DE | 35 32 078 | | 4/1986 |
| DE | 40 20 351 | | 1/1992 |
| DE | 196 33 941 | A1 | 2/1998 |
| DE | 196 38 781 | C2 | 9/1998 |
| DE | 197 11 979 | A1 | 10/1998 |
| EP | 0 581 509 | | 2/1994 |
| EP | 0-640-740 | A1 * | 8/1994 |
| JP | 8-254074 | | * 10/1996 |
| JP | 11-93512 | | * 4/1999 |

* cited by examiner

Primary Examiner—Marlon T. Fletcher
(74) Attorney, Agent, or Firm—Kenyon & Kenyon

(57) ABSTRACT

In a closing device, in particular for a motor vehicle window or sunroof, having a drive motor (4) for pushing a closing element such as a window pane or roof panel across an opening to be closed, a sensor (3) for detecting a force acting on the closing element in the opposite direction to the direction of closing, and a control circuit (1) for monitoring the force and interrupting the closing element's closing movement if the sensor (3) detects that the force exceeds a limit value, the control circuit (1) varies the limit value depending on force measured at an earlier point in time. As a result, it is possible to distinguish between disruptive influences on the closing device, in particular external acceleration forces acting on the closing element, from forces arising as a result of a body part being trapped in the opening, reversing of the closing device only being permitted in the latter instance.

11 Claims, 3 Drawing Sheets

CLOSING DEVICE WITH A SAFETY FUNCTION

FIELD OF THE INVENTION

The present invention relates to a closing device having a safety for the following purpose: When a closing element that moves across an opening closes the opening, the safety function keeps objects that may be located in the opening from being trapped and damaged.

BACKGROUND INFORMATION

An important area of applications for closing devices of this kind is, for example, the side windows or roof windows of motor vehicles in the case of which a window pane or, respectively, sunroof is moved with the help of an electric drive motor.

Per the legal regulations, closing devices of this kind for vehicle windows are to have a trapping protection function that is designed to, to as great an extent as possible, keep users from being injured if they trap body parts. This protection function is achieved by limiting the closing force exerted by the closing device to 100 N.

As a general rule, this is achieved via, for example, closing devices in which the speed of the closing element, the torque exerted by its drive motor, or a force acting on the closing element in the opposite direction to its movement is detected, the closing movement being reversed if changes in these detected values indicate that an object may be trapped in the opening.

It has become clear that simply limiting the closing force to a maximum of 100 N does not provide adequate protection against injuries to the user if, for example, his or her hand or individual fingers accidentally become trapped. Therefore efforts have been made to develop closing devices having trap protection that exert a lower maximum force. However, problems arise if the closing devices are exposed to vibration during operation, in particular if they are used as closing devices for the window panes or sunroof of a motor vehicle. These vibrations cause parameters such as motor torque and counterforce, which are monitored by the closing device in order to limit the closing force, to fluctuate temporarily. The lower the predefined maximum closing force of the closing device, the easier it is for the parameter that is being monitored to exceed a limit value for which the closing device detects that the maximum closing force has been exceeded and thereupon interrupts or reverses the closing movement. For example, with a device of this kind it may be impossible to close the side window of the motor vehicle when the vehicle is driving across uneven terrain.

In order to tackle this problem, German Published Patent Application No. 4020351 proposes a closing device to which a sensor element supplies measured signals resulting from acceleration forces exerted on the vehicle body in the vertical direction. The accelerations measured this sensor element are offset against the monitored parameters of the closing device, which are measured simultaneously so that the disruptive influence of these accelerations can be suppressed.

It is true that this technology ensures that the closing device functions more reliably even if the closing force limit values are lower than the 100 N permitted by law; however, for various reasons it is not totally satisfactory.

One problem is that as a general rule the mechanical structure of the closing device is not absolutely rigid, so that as a result of external vibrations the closing element or its drive mechanism may start to vibrate, and as a result force peaks greater than the closing force limit values may be detected at the drive motor even after the external vibration has already decayed. The known device cannot compensate for reverberation of this kind, so that undesired reversing may still occur as a result of vibration during the closing movement.

Another problem is that frictional resistance arising when the closing element moves up and down its guideway or arising in the drive mechanism of the guideway element can also cause the parameter that is monitored to exceed the limit value at which the closing device detects that the closing force limit value has been exceeded. If, for example, the parameter that is being monitored is the torque exerted by the drive motor of a window raiser, it is clear that this will increase not only if an object has been trapped between the window pane and its frame but also if there is frictional resistance that keeps the window pane from moving freely up and down its guideway. Such frictional resistances may increase during the operating life of a closing device due to wear and tear; in addition, for design-related reasons they may have different values at different points in the closing movement. In the case of the known closing device, the only way to take this into account is to ensure that the chosen closing force limit value is not too low and in particular to ensure that when one defines the limit value a safety margin is calculated in to reflect the possibility that with increasing age the closing device will start to encounter greater frictional resistance.

SUMMARY OF THE INVENTION

In the case of the present invention, a closing device, in particular for the window or sunroof of a motor vehicle which allows one to choose a sufficiently low closing force limit value is provided, the closing movement being interrupted, or reversed if the limit value is exceeded, so that there is no absolutely no risk of injury if a body part becomes trapped in the opening to be closed. Because the closing force limit value can be varied, this limit value can be calculated very precisely for normal operating conditions, without the need for a safety margin for taking into account uneven distribution of frictional forces across the range of closing movement or due to aging of the closing device. Because the device varies the limit value based on force exerted on the closing element that has been measured at an earlier point in time, it can filter out vibrations to which the closing element is exposed, a separate sensor for this purpose being unnecessary. By choosing a suitable time period during which a variation in the limit value lasts, the device can be rendered insensitive to reverberation phenomena in the closing element following external vibration or, respectively, in the drive mechanism used to transfer the closing force of a motor to the closing element, which can cause the force to be exerted by the motor to fluctuate.

Preferably the force limit value is varied in such a way that if the sensor which detects the force exerted on the closing element in the direction opposite to closing detects an abrupt decrease in this force, the control circuit increases the lit value for a limited time period or for a limited stretch of the closing element's path. This is based on the realization that an abrupt decrease in the force is generally due to the fact that the object on which the closing device is mounted is being accelerated downwards and that an upward acceleration will follow immediately once the object's downward movement comes to an end. In the case of a motor vehicle, this situation occurs, for example, when the vehicle drives off a curbstone or into a recess such as a pothole. The upward acceleration causes the force in the direction opposite to the closing movement to increase but is not due to trapping of an object and is therefore ignored by the closing device according to the present invention by the limit value being increased at the point in time when this force arises.

Herein, in particular, the control circuit may detect the length of a time period or length of stretch of the closing element's path during which the decrease in the force lasts. It is reasonable to anticipate that the acceleration in the opposite direction will be roughly of the same absolute value and will last for roughly the same time; therefore it is useful if the time period or the length of stretch of the path during which limit value is increased is chosen to be exactly equal to, or better still, given that there may be vibration phenomena, greater than the length that has been detected.

It is useful if the amount by which the limit value is increased as a result of a downward acceleration is proportional to the downward acceleration measured during the period during which the decrease in force lasted.

According to a preferred further refinement of the present invention, the control circuit determines the change in force based on the distance traveled by the closing element and increases the limit value if the force as a function of distance traveled increases at a rate higher than that defined by a limit spring rate.

If the increase in force is due to the vehicle having been accelerated upwards, it generally occurs within small fractions of a second, which correspond to a distance traveled by the closing element of just a few millimeters or fractions of a millimeter, i.e., corresponding to a high spring rate. In this case, undesired reversing of the losing device can be suppressed by increasing the limit value. If a body part is trapped, the increase in force is, by comparison, significantly less rapid. Injury associated with trapping of body parts can be prevented by using a low force limit value in conjunction with a low spring rate. A suitable value for the limit spring rate is, for example 20 N/mm or more. A simple way to increase the force limit value is for the control circuit to temporarily interrupt monitoring of the force.

According to a particularly preferred feature of the present invention, the closing device includes a memory for storing force values for a given position or plurality of adjacent positions of the closing element. The stored force values may be force values measured at the positions in question or limit values that are valid for the positions in question. These values may be predefined so that each one is different for a given position of the closing element so as to reflect the fact that the closing force to be exerted may vary due to the design of the closing device.

It is useful if these force values or limit values are updated on an ongoing basis by generating sliding averages of the forces exerted on the closing element at given positions so that wear-and-tear phenomena, dirt etc. to which the closing device is subject may be taken into account.

It is useful that force values measured during a closing movement are not used to update the sliding averages until it has been determined that a deviation in a measured force value relative to the corresponding stored value has not resulted in interruption of the closing movement. This means one can avoid a situation where the sliding averages are calculated incorrectly using measured force values associated with an actual trapping event.

Furthermore, it is preferred if each stored force value is obtained by generating the mean for a plurality of adjacent positions of the closing element. This saves memory space; moreover, by generating the mean by carrying out averaging for a plurality of positions in the course of a closing movement one can largely suppress the impact of individual erroneous measurements.

Further features and advantages of the present invention are set forth in the description below and with reference to the figures.

DETAILED DESCRIPTION

Figure 1:
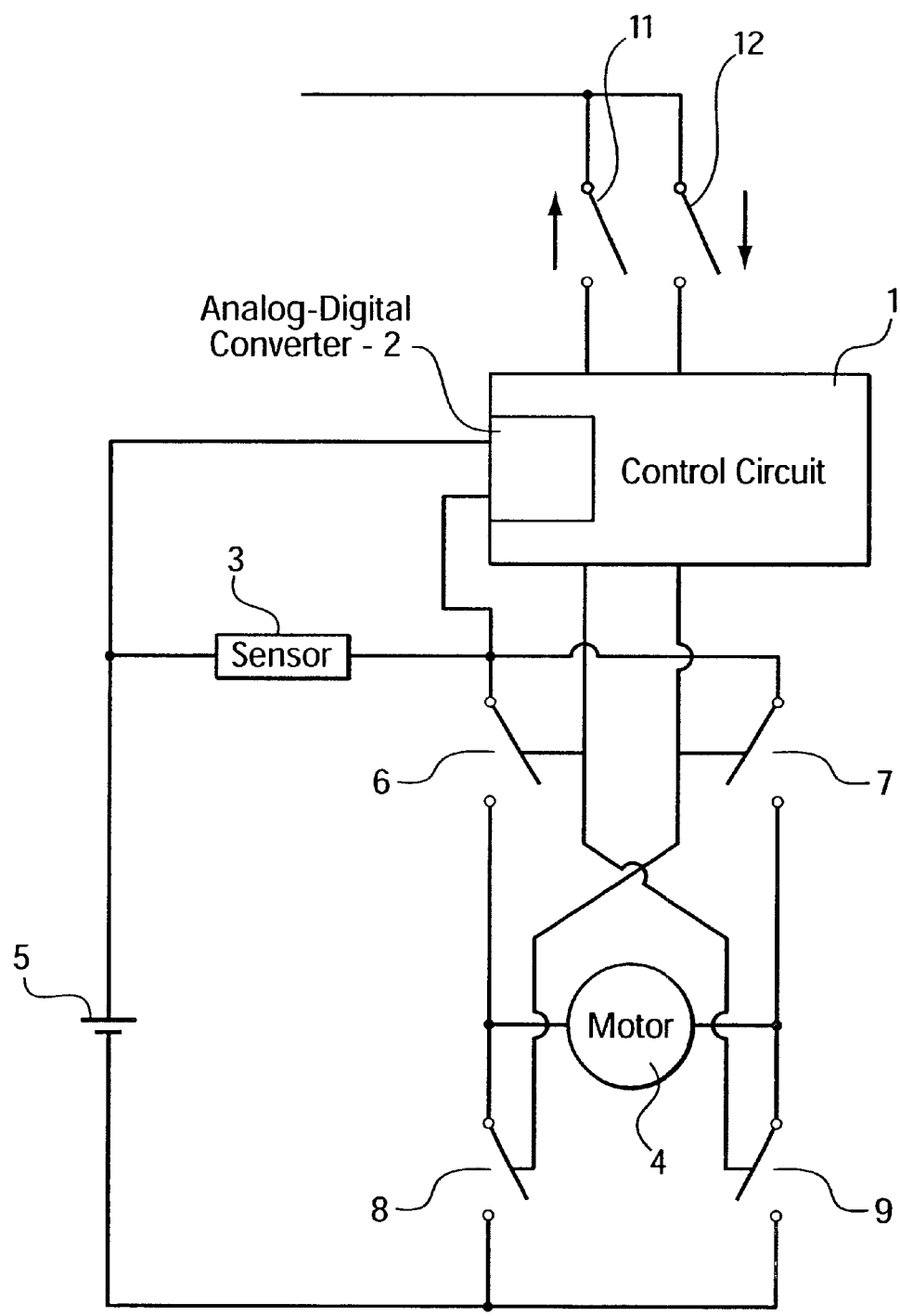
FIG. 1 shows the design of a closing device according to a first exemplary embodiment of the present invention.

FIG. 1 shows a schematic circuit diagram of a first exemplary embodiment of a closing device according to the present invention for a motor vehicle window having control circuit 1, which may be embodied as a microprocessor or microcontroller. Control circuit 1 receives an "open" or "close" instruction from control switches 11 and 12, which are arranged in the passenger compartment of the motor vehicle and can be operated by a person situated therein in order to close (control switch 11) or open (control switch 12) a window. Control circuit 1 may be assigned to a given individual moveable window pane, in which case it only receives signals from two control switches 11, 12; alternatively, it may be assigned to a plurality or all of the moveable window panes and a sunroof of the motor vehicle, and accordingly may have inputs for a large number of control switches. For the sake of clarity, below we have only considered the situation where control circuit 1 is assigned to a single window pane, as embodying the present invention in the form of a control circuit for a plurality of windows or, respectively, for windows and a sunroof using the description below would not present any difficulties to a person skilled in the art.

Power source 5, which, if the present area of application is a motor vehicle, is the motor vehicle's battery, is provided so as to supply a drive current to motor 4 via a plurality of switches 6, 7, 8, 9. The status of switches 6 to 9 is controlled by control circuit 1 in a manner that will be described in detail below.

A mechanism for converting the rotary movement of motor 4 into a translation movement for a closing element such as, for example, a window pane of a sunroof of a motor vehicle, is known heretofore, so it does not have to be described in detail here.

Resistor 3 is arranged in series with the circuit formed by power source 5, motor 4 and switches 6 to 9. Particularly in the case of a motor 4 whose angular velocity is constant independently of the torque being applied, the voltage drop across resistor 3 is proportional to the output of motor 4 and is thus proportional to the torque and, respectively, the force acting against the movement of the closing element, which is being pushed by motor 4. Thus the resistor fulfills the function of a sensor 3 used to measure the force acting on the closing element in the opposite direction to closing.

The potentials that arise at the terminals of the resistor are detected by an analog-digital converter, and the digitized value of the potential difference is sent to control circuit 1 by the analog-digital converter. In the state shown in the Figure, control switches 14, 12 and switches 6 to 9 are open, and motor 4 is stationary.

If a person operates down control switch 12, control circuit 1 closes switches 6 and 9 and thus applies a voltage of a certain polarity to motor 4, thus causing the motor to turn in the direction that corresponds to an opening movement of the closing element. During this time, control circuit 1 does not have to monitor the measured values sent by analog-digital converter 2, because if the closing element is moving downwards there is no risk of trapping. Switches 6 and 9 are kept closed for as long as control switch 12 is operated or until an external sensor (not shown) of control circuit 1 signals that the closing element has reached a fully open position. Alternatively, control circuit 1 may also evaluate the digitized value for the voltage drop across sensor-resistor 3 sent by the analog-digital converter and open switches 6 and 9 if it recognizes from an abrupt increase in the digitized values that the closing element has reached an abutment at the end of its path in the fully open position.

If a person operates up control switch 11, control circuit 1 closes switches 7 and 8 and thus applies a voltage of a certain polarity to motor 4, which causes it to move the closing element in the direction of closing. In this case the voltage drop across sensor-resistor 3 is monitored on an ongoing basis by control circuit 1. In a first operating state of the control circuit, designated the normal operating state, control circuit 1 detects the value sent by analog-digital converter 2, compares it with a first limit value and determines its rate of change as a function of time or as a function of distance traveled by the closing element. If the rate of change is low, in particular less than 20 N/mm and the force exceeds a first limit value of less than 100 N, control circuit 1 opens switches 7 and 9 and closes switches 6 and 9, whereupon the closing element moves in the direction of opening. Thus if the increase in force was due to the fact that an object was trapped in the opening to be closed by the closing element, the object will be released thanks to the closing element's opening movement.

If the closing device is exposed to vibrations, in particular if it is used in a motor vehicle and the vehicle is traveling across uneven terrain, inertial forces may act on the closing element and cause the measured values sent by sensor-resistor 3 to be incorrect.

If the closing device according to the present invention is used to close the side window of the motor vehicle and the motor vehicle drives across, for example, a pothole, the pane that forms the closing element is initially accelerated in the direction of closing; thereafter, the pane is slowed by a force proportional to this acceleration. The closing device additionally applies this proportional force in order to move the pane in the direction of closing. As a result, the force detected via sensor-resistor 3 may exceed the first limit value without an actual trapping event having occurred. Therefore after it has detected an abrupt decrease in the force via sensor-resistor 3, control circuit 1 switches over to a second state in which the force that has been detected is compared with a second limit value that is greater than the first. The difference between the two limit values is proportional to the decrease in force that was detected before. It is useful if the proportionality factor and/or length of time during which the second state is maintained are set based on the suspension characteristics of the motor vehicle and the drive mechanism of the window pane. In general the following is true: The harder the suspension, the greater the second limit value and the proportionality factor that is chosen so as to avoid an undesired reversing of the window pane when the vehicle drives across a pothole, and also the shorter the time span during which increased force acts on the window pane, and thus the shorter the length of time for which the second state is maintained. The minimum duration of the second state is equal to the length of time during which the decrease in force before was detected.

If the vehicle drives across a bump on the road, this results in an upward acceleration of the vehicle and, respectively, a downward force on the window pane which may cause the first limit value to be exceeded. In such instances, to prevent erroneous reversing of the pane, the control circuit compares the rate of change of the force exerted by the motor with a limit spring rate of, for example, 20 N/mm. If a person's body part is trapped in the window opening, the measured increase in the force as a function of the distance traveled is less than this value. If the measured increase is greater, this is a sign that the increase in force is due to external vibration and reversing of the closing devices is therefore unnecessary or in fact undesirable. In a situation of this kind, control circuit 1 responds as follows: It temporarily goes into a third state in which the force being exerted is compared with a third limit value, which is also greater than the limit value applicable in the first operating state, or in which the force being exerted is not compared with a limit value, which in practice is the equivalent of increasing the limit value to infinite.

In all instances, the closing device according to the present invention varies the limit value with which the force exerted by the motor on the closing element is compared, not based on acceleration exerted from outside and measured using an additional external sensor but rather solely based on a force measured at an earlier point in time.

Figure 2:
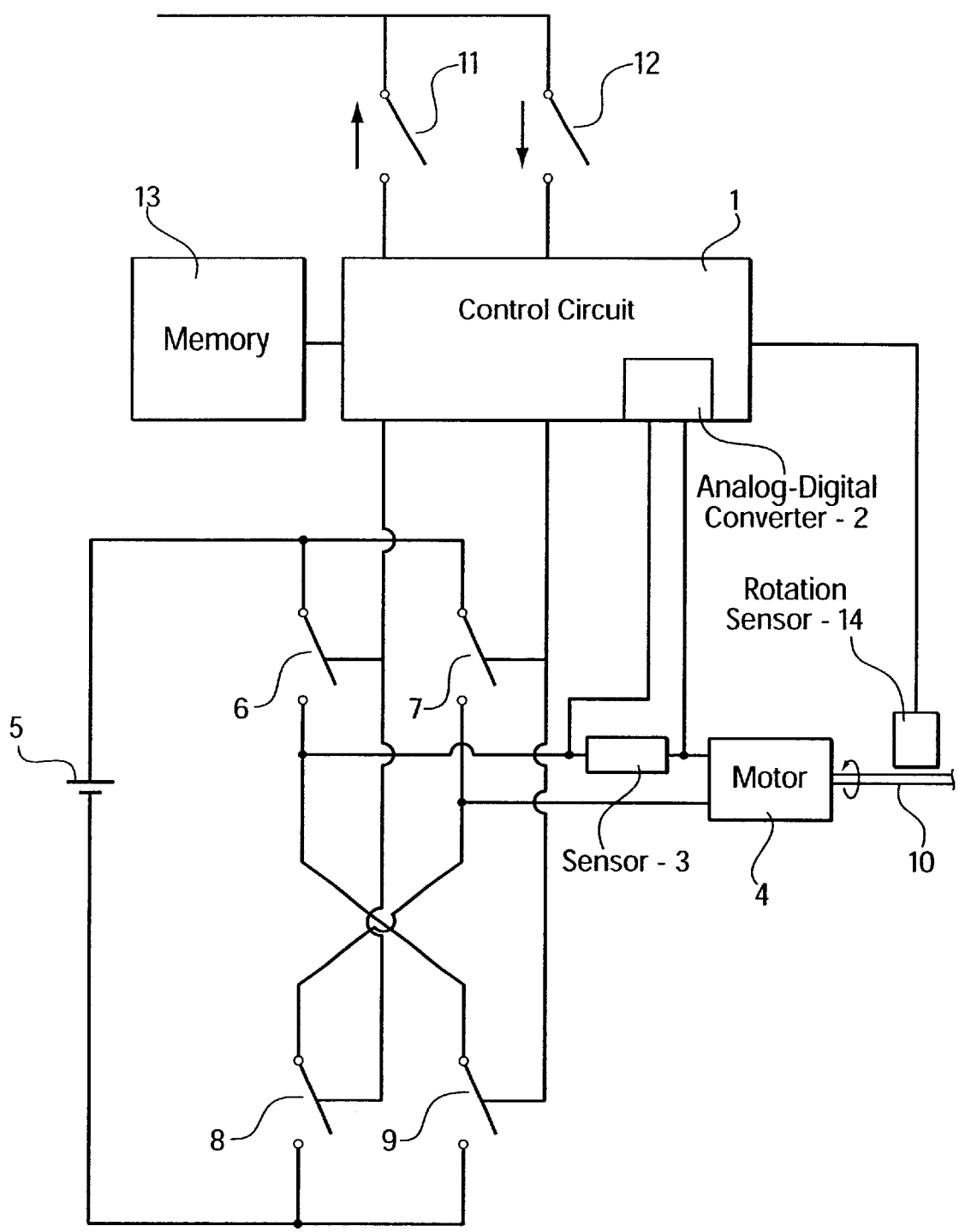
FIG. 2 shows the design of a closing device according to a second exemplary embodiment.

FIG. 2 shows an example of a further refinement of a closing device according to the present invention. Analog-digital converter 2, sensor-resistor 3, motor 4, power source 5, switches 6 to 9 and control switches 11, 12 are the same as those in the exemplary embodiment shown in FIG. 1; we have therefore not described them again. In the case of the exemplary embodiment shown in FIG. 2, control circuit 1 is in addition connected to memory 13 and rotation sensor 14, which is, for example, in the form of an inductive sensor and is arranged on driven shaft 10 of motor 4. With the help of rotation sensor 14, control circuit 1 "detects" at each point in time the angle of rotation that shaft 10 has traveled from a stop, which may correspond to either the open or closed position of the closing element, and thus detects the current position of the closing element. Memory 13 contains, for each position of the closing element, a value for the closing force usually applied in the position in question. This value is subtracted from the current closing force detected via sensor-resistor 3. Ideally the difference obtained in this way is an exact measure of the forces acting on the closing body, either due to forces arising from external acceleration or due to forces exerted by an object trapped in the opening to be closed, independently of frictional forces arising in the drive mechanism of the closing body or in the closing body's guideway.

According to a first version, the content of memory 13 is fixed and predefined by the manufacturer of the closing device. In this case, the force values entered in memory 13 may be values that have been measured from a reference version of the closing device and based on which it may reasonably be anticipated that similar forces will arise in closing devices having a similar design and produced in series production. This allows one, for example, to compensate for local frictional force maxima that result from the design of the closing device and in particular from the design of the closing element drive mechanism, for example near a dead center of the drive mechanism.

According to a second version, the values may be measured for a given individual closing device and stored in memory 13 assigned to this closing device.

In the case of a third version, during operation of the closing device control circuit 1 updates the value in memory 13 on an ongoing basis so that long-term changes, for example phenomena associated with wear-and-tear, may be taken into account. This ongoing updating is based on the principle of sliding averaging where if the force measured at a given position of the closing element differs from the stored force value for that position, the stored value is brought in line with the measured value with the help of a correction amount, the correction amount being smaller than the difference between the stored value and the measured value. However, updating of this kind is only carried out if it is certain that an increase in the closing force measured during a closing movement is not due to a trapping event.

Figure 3:
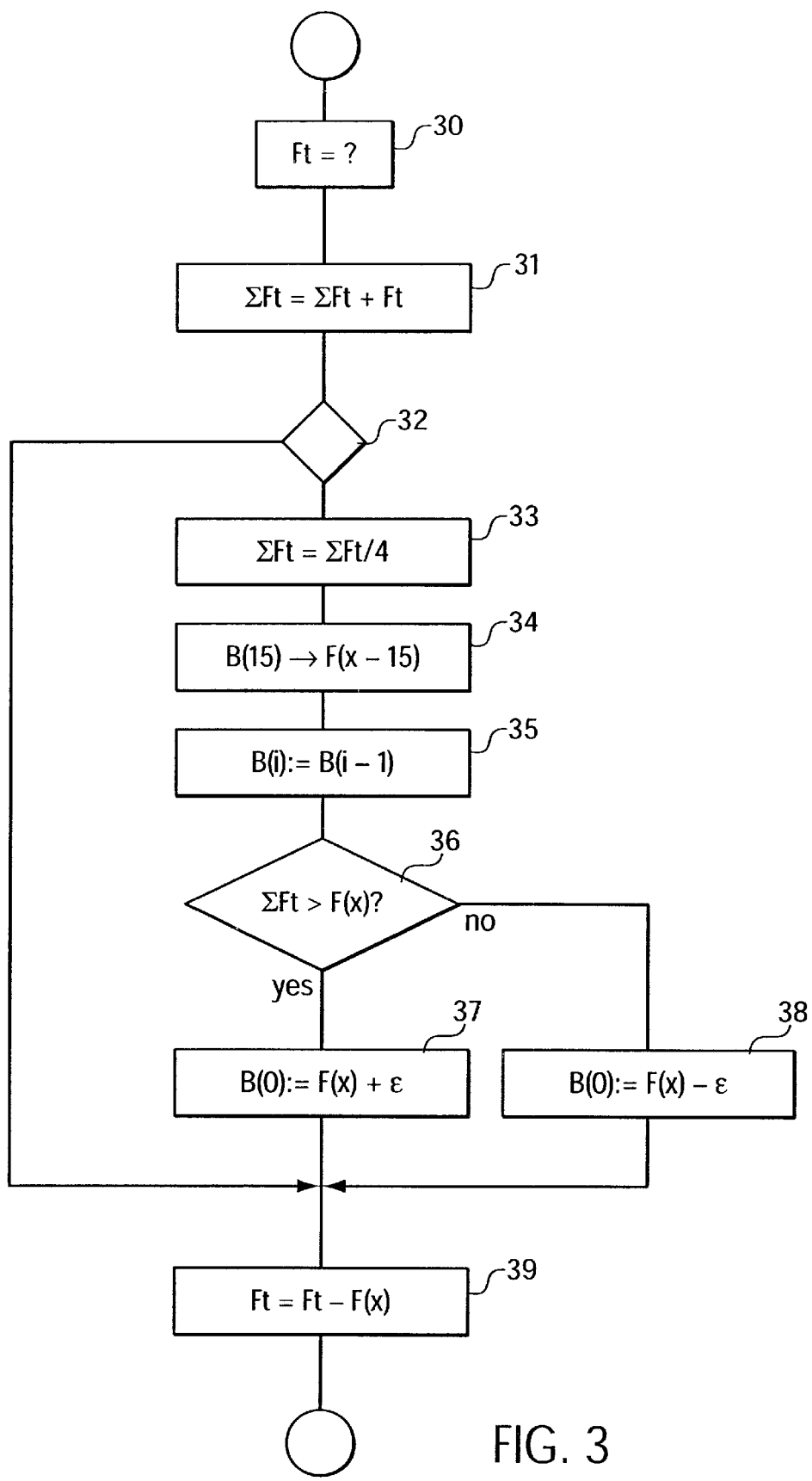
FIG. 3 shows a flow chart indicating the processing operations carried out by the control circuit of the exemplary embodiment shown in FIG. 2.

A special embodiment of the processing operations carried out by control circuit 1 in order to eliminate frictional forces from the force detected by sensor-resistor 3 and to perform ongoing updating of the force values stored in memory 13 is described with reference to FIG. 3. The closing force exerted by the motor is detected on a cyclical basis and the processing operations shown in the Figure are carried out in each detection cycle.

Processing begins with Step 30, in which a value Ft indicating the closing force being exerted is detected. In Step 31, the detected value Ft is added to a sum value ΣFt. In this summation step the sum of the force values Ft for four consecutive measuring positions x is generated. In Step 32, a decision is made as to whether the present cycle is a fourth cycle, i.e., whether four force values Ft have been added. If not, processing jumps to Step 39; otherwise, in Step 33, the sum ΣFt is divided by the number 4 of the summands that have been added up so as to generate the mean of the forces exerted for the four positions.

A buffer B(0, 1 . . . , 15) contains values that have been derived from the last sixteen means that have been generated. In Step 34, the oldest of these values, B(15), is stored at memory location (x−15), which corresponds to the position of the closing element at the time the value was obtained, in table of force values F in memory 13. Next, the remaining elements in the buffer, B(0) to B(14) are moved up one position each in the buffer, to positions 1 to 15.

In Step 36, mean ΣFt is compared with value F(x) for the corresponding position x of the closing element stored in table F of memory 13. If the newly measured mean ΣFt is greater, in Step 37 the stored value F(x) of the force for the corresponding position x plus increment ε is entered in buffer B(0). If the mean ΣFt is less than F(x), in Step 38 the value F(x)−ε is entered in B(0). Herein, ε may be a fixed predefined amount; it may also be proportional to difference ΣFt−F(x), and if so the proportionality relationship is a measure of how quickly the stored values F(x) are following the actual conditions if the frictional forces that are occurring are changing.

Next, in Step 39, the stored force value F(x) is subtracted from current measured value Ft. Ideally the force value Ft that has been adjusted in this way should only deviate from 0 if external forces such as acceleration forces or forces associated with a trap event are acting on the closing element.

In a subsequent processing operation, which is not shown in the Figure, control circuit 1 monitors force value Ft that has been adjusted in this way to determine whether a force limit value has been exceeded or whether the value is changing in a way that indicates that an external acceleration or, respectively, vibration is acting, for example due to an abrupt decrease or increase in the force as described above with reference to FIG. 1. If as a result of this monitoring a trapping event is detected, all elements of buffer B are overwritten with stored force values F(x−15) to F(x). This ensures that an increase in the force that occurred before the trapping event was detected does not result in a change in the force values stored in memory 13.

The closing device according to the present invention compensates for external accelerations that might disrupt detection of the closing force by modifying the limit value with which the force being exerted is compared; it is thus possible to set the limit value that is valid when control circuit 1 is in the normal operating state at a considerably lower level than the 100 N specified in the standards currently valid in the auto industry; as a result one can significantly improve the extent to which individuals can be protected against trapping events, without rendering the closing device less reliable, and without unwanted reversing.

In the case of the exemplary embodiment described above with reference to FIG. 3, the force values stored in memory 13 correspond to the forces exerted by the closing device in order to overcome friction during normal operation. According to a further version, instead of these values, values that correspond to the frictional force plus an additional amount, which in particular may be equal to the limit value valid during the normal operating state, may be stored in memory 13.

Naturally in the present invention one does not have to use sensor-resistor 3 as the element for detecting the force exerted by the motor. In general, any sensor or sensor arrangement that allows detection of the force being exerted can be used, for example a piezo element or wire strain gauge in the drive mechanism.

What is claimed is:

1. A closing device, comprising:
    a drive motor for displacing a closing element across and opening to be closed;
    a sensor for detecting a force acting on the closing element in a direction that is opposite to a direction of closing;
    a control circuit for monitoring the force and interrupting a closing movement of the closing element if the sensor detects that the force exceeds a limit value, wherein:
        the control circuit varies the limit value depending on the force measured at an earlier point in time; and
        the control circuit increases the limit value for one of a limited time and a limited portion of a path of the closing element if the sensor detects an abrupt decrease in the force.

2. The closing device according to claim 1, wherein:
    the closing element includes one of a motor vehicle window and a sunroof.

3. The closing device according to claim 1, wherein:
    the control circuit detects one of a length of the limited time period and a length of the limited portion of the path of the closing element during which the decrease in the force lasts, and
    the control circuit increases the limit value for one of another time period and a length of another portion of the path of an at least equal order of magnitude.

4. The closing device according to claim 1, wherein:
    the control circuit determines a downward acceleration of a motor vehicle during which the decrease in the force lasts, and the control circuit increases the limit value by an amount that is proportional to the downward acceleration.

5. The closing device according to claim 1, wherein:

the control circuit determines a change in the force based on a distance traveled by the closing element, and the control circuit increases the limit value if the force as a function of the distance traveled increases at a rate higher than that defined by a limit spring rate.

6. The closing device according to claim 5, wherein:

the limit spring rate is one of greater than and equal to 20 N/mm.

7. The closing device according to claim 5, wherein:

the control circuit increases the limit value by temporarily interrupting a monitoring of the force.

8. The closing device according to claim 1, further comprising:

a memory for storing force values, each one of the force values corresponding to a position of the closing element.

9. The closing device according to claim 8, wherein:

the memory includes sliding averages of the force acting on the closing element in the position of the closing element.

10. The closing device according to claim 8, wherein:

the memory contains sliding averages of the force acting on the closing element in the position of the closing element plus an additional amount.

11. The closing device according to claim 9, wherein:

the control circuit does not update the sliding averages until a deviation in a measured force value relative to a corresponding one of the stored force values has not resulted in an interruption of the closing movement.

* * * * *